United States Patent Office 3,240,841
Patented Mar. 15, 1966

3,240,841
METHOD OF PREVENTING COLD FLOW IN CIS-POLYBUTADIENE BY ADDING A POLYEPOXIDE
Henry L. Hsieh, Bartlesville, Okla., assignor to Phillips Petroleum Company, a corporation of Delaware
No Drawing. Filed July 9, 1962, Ser. No. 208,623
6 Claims. (Cl. 260—836)

This invention relates to a method for preventing or substantially reducing the tendency of cis-polybutadiene to cold flow. In one aspect, it relates to a novel composition containing cis-polybutadiene and a polyepoxy compound, in which the tendency of cis-polybutadiene to cold flow is substantially reduced.

In recent years, a great deal of research work has been conducted in the fields of olefin polymerization. Great advantages have been recently made in this field as the result of the discovery of new catalyst systems. These catalyst systems are often described as being "stereospecific" since they are capable of polymerizing monomers, particularly conjugated dienes, to a certain geometric configuration. One of the products which has attracted widespread attention because of its superior properties is a polybutadiene containing a high percentage, e.g., at least 85 percent, of cis 1,4-addition. The physical properties of this high cs-polybutadiene are of such a nature that the polymer is particularly suitable for the fabrication of heavy duty tires and other articles for which conventional synthetic rubbers have heretofore been comparatively unsatisfactory. However, in the processing of high cis-polybutadiene, particularly in packaging, shipping and storage, a certain amount of difficulty has been encountered because of the tendency of the polymer to cold flow when in the unvulcanized state. For example, if cracks or punctures develop in the package used in storing the polymer, polymer will flow from the package with a resulting loss or contamination and sticking together of stacked packages.

It is an object of this invention, therefore, to provide a method for eliminating or substantially reducing the tendency of cis-polybutadiene to cold flow when in the unvulcanized state.

Another object of the invention is to provide a novel composition which contains cis-polybutadiene and a small amount of a compound which prevents or substantially reduces cold flow.

Other and further objects and advantages of the invention will become apparent to those skilled in the art upon consideration of the accompanying disclosure.

The present invention is concerned with a method for treating cis-polybutadiene so as to substantially reduce its tendency to cold flow. The invention resides in the discovery that the tendency of cis-polybutadiene to cold flow can be reduced if the polymer is treated with a minor amount of a polyepoxy compound containing at least two oxirane

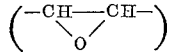

groups. It is preferred that the rest of the molecule be hydrocarbon or a compound made up solely of carbon oxygen and hydrogen. The amount of the polyepoxy compound employed is usually in the range of 0.25 to 10, preferably in the range of 0.5 to 5, parts by weight per 100 parts by weight of rubber. Broadly speaking, the method of this invention comprises the step of heating cis-polybutadiene in the presence of a small amount of a polyepoxy compound containing at least two oxirane groups. The percent of epoxy oxygen usually exceeds 0.5 weight percent and is preferably in the range of 2 to 12 weight percent or higher, based on the weight of the polyepoxy compound.

In conducting the method of this invention, the cis-polybutadiene, which is recovered from the polymerization process as described hereinafter, is heated in the presence of the polyepoxy compounds at a temperature in the range of 30 to 150° C. (86 to 302° F.), preferably at a temperature in the range of 75 to 120° C. (167 to 245° F.). The time of treatment will depend upon the specific temperature utilized and will usually vary in the range from 5 minutes to 200 hours. When a temperature in the preferred range is employed, satisfactory results can usually be obtained in a period ranging from 30 minutes to 5 hours.

Any suitable method which will give an intimate blend can be used in incorporating the polyepoxy compound into the cis-polybutadiene. A convenient method for effecting the treatment of the polymer is to incorporate the polyepoxy compound in the rubbery polymer on a roll mill, in a Banbury mixer, or similar kneading device. The mixing operation is conducted at a temperature and for a period of time as specified above. It is to be understood that the heating can be accomplished during the mixing operation or the materials can be mixed and then heated in a separate step. Another convenient procedure involves blending solutions of the two materials after which the polymer is coagulated with a suitable reagent, such as an alcohol, or the solvent is removed by steam stripping. Still another method comprises incorporating the polyepoxy compound into the cis-polybutadiene which has been coagulated from the polymerization mixture and is still wet. After being treated by the method of this invention, the polymers can then be packaged and stored or transferred for utilization elsewhere. The polymer can be blended, compounded, fabricated and cured according to procedures which are well-known in the rubber art. While the present invention is not dependent upon any particular reaction mechanism, it is important that the polyepoxy compound be intimately blended with the cis-polybutadiene and that the time and temperature of treatment be adjusted to produce the desired effect.

Specific examples of polyepoxy compounds which can be used in the practice of this invention include diepoxybutane, 1,2,5,6-diepoxyhexane, triepoxyhexane, 1,2,5,6,9,10-triepoxydecane, 2,3,6,7,11,12-triepoxydodecane, 2,3,5,6-diepoxy-9-epoxyethyldodecane, pentaepoxyeicosane, 2,3,5-triepoxyethyl-9,10-epoxyhexadecane, bis(epoxydicyclopentyl)ether of ethylene glycol, limonene dioxide, vinylcyclohexene dioxide, and the like. Epoxidized polybutadiene, epoxidized fatty acids or fatty esters, such as vegetable oils, or the like can be employed in the practice of the present invention. Compounds particularly useful as treating agents are the epoxidized liquid polybutadienes containing three or more epoxy groups per molecule.

These epoxidized polymers can be prepared by treatment of a liquid polymer of butadiene with a peracid, such as performic or peracetic acids. The epoxidized polymers contain a multiplicity of epoxy groups situated in the polymer chain and/or in the side chains present therein. Hydroxy and/or ester groups can be present in the polymer molecule without adverse effects.

The present invention is generally applicable to polybutadienes containing a high percentage of cis 1,4-addition. It is usually preferred that the cis-polybutadiene contain at least 85 percent cis 1,4-addition, e.g., 85 to 98 percent and higher. The cis-polybutadiene can be prepared by polymerizing 1,3-butadiene with a large number of different stereospecific catalysts. It is usually preferred to employ a catalyst which is selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl, M is aluminum, mercury, zinc, beryllium, cadmium, or magnesium, and $m$ is equal to the valence of the metal M, and titanium tetraiodide, (2) a catalyst comprising an organometal compound having the formula $R_nM'$, wherein R is an organo radical as defined above, M' is aluminum, magnesium or lead, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclophentylzinc and titanium tetraiodide; tri(3-isobutylcyclohexyl)aluminum and titanium tetraiodide; tetraethyllead, titanium tetrachloride and titanium tetraiodide; dimethylphenyllead, titanium tetrachloride and titanium tetraiodide; dipropylmagnesium and titanium tetraiodide; dimethylmagnesium, titanium tetrachloride and iodine; diphenylmagnesium and titanium tetraiodide; di-n-propylmagnesium, titanium tetrachloride and titanium tetraiodide; dipropylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobuylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide and aluminum triiodide; tri-n-butylaluminum, titanium tetrachloride, and antimony triiodide; tricyclophenylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 1.0 to 20 mols per mol of the halogen-containing component, i.e., a metal halide with or without a second metal halide or elemental iodine. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from —100 to 250° F. It is usually preferred to operate at a temperature in the range of —30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 4,4'-methylene-bis-(2,6-di-tert-butylphenol), to the polymer solution prior to recovery of the polymer. The polymer which has been recovered by these methods is then treated in accordance with the present invention so as to reduce the tendency of the polymer to cold flow.

A more comprehensive understanding of the invention may be obtained by referring to the following illustrative examples, which are not intended, however, to be unduly limitative of the invention.

EXAMPLE I

Two runs were carried out in which cis-polybutadiene was prepared by polymerizing 1,3-butadiene in the presence of a catalyst consisting of triisobutylaluminum, titanium tetrachloride and free iodine. The polybutadiene products obtained in these runs contained about 95 percent cis 1,4-addition and are designated in the table hereinafter as polymers A and B. Samples of the two polymers were treated with three different epoxidized liquid polybutadienes. In certain of the runs, a toluene solution of the epoxidized polybutadiene was added either to a toluene or cyclohexane solution of the polymer. After the materials were thoroughly blended, the solvent was removed by steam stripping, and the polymer was dried in a vacuum oven at 60° C. In one run, instead of steam stripping, the product was coagulated in isopropyl alcohol, separated, and dried in a vacuum oven at 60° C. In another run, the epoxidized liquid polybutadiene was blended with the cis-polybutadiene on a two-inch roll mill, the blending being done for about 15 minutes at about 210–240° F. The results of the runs are shown hereinafter in Table I.

TABLE I

| Run No. | Polymer designation | Treating agent [1] Type | Phr. | Conditions of treatment | Inherent [5] viscosity | Gel,[6] percent | ML-4 [7] at 212° F. | Cold flow,[8] mg./min. |
|---|---|---|---|---|---|---|---|---|
| 1 | A | None | 0 | | 2.53 | 0 | 47 | 5.4 |
| 2 | A | Oxiron 2000 | 3 | Solution blended (toluene),[2] steam stripped, vacuum oven dried. | 2.79 | 7 | 65 | 0 |
| 3 | B | None | 0 | | 2.45 | 0 | 38 | 8.6 |
| 4 | B | Oxiron 2000 | 3 | Solution blended (toluene),[2] steam stripped, vacuum oven dried. | 2.46 | 8 | 55 | 0 |
| 5 | B | ___do___ | 3 | Blended on 2-inch roll mill. | 2.36 | 0 | 33 | 8.3 |
| 6 | B | ___do___ | 3 | Solution blended (cyclohexane),[3] steam stripped, vacuum oven dried. | 2.26 | 10 | 52.5 | 1.0 |
| 7 | B | Oxiron 2001 | 2 | (a) Solution blended (toluene),[4] coagulated in isopropyl alc., vacuum oven dried. | | | | 4.2 |
| | | | | (b) Dry sample placed in boiling water bath 1 hours. | | | 49 | 1.1 |
| 8 | B | None | 0 | Dry polymer placed in boiling water bath 2 hours. | | | 39.5 | 8.5 |
| 9 | B | Oxiron 2000 | 3 | Solution blended (toluene),[2] Steam stripped, vacuum oven dried. | 2.56 | 6 | 44 | 0.3 |
| 10 | B | ___do___ | 2 | ___do [2]___ | 2.53 | 7 | 46 | 1.3 |
| 11 | B | ___do___ | 1 | ___do [2]___ | 2.55 | 5 | 46 | 1.2 |
| 12 | B | ___do___ | 0.5 | ___do [2]___ | 2.58 | 3 | 44 | 4.0 |
| 13 | B | Oxiron 2002 | 3 | ___do [2]___ | 2.55 | 7 | 47 | 0.7 |

[1] Oxiron 2000, 2001, and 2002 are commercially available liquid epoxidized polybutadienes.

| | Oxiron 2000 | Oxiron 2001 | Oxiron 2002 |
|---|---|---|---|
| Appearance | (¹) | (²) | (²) |
| Viscosity, poises at 25° C | 1,800 | 160 | 15 |
| Epoxy content, % (oxirane oxygen) | 9.0 | 11.0 | 6.9 |
| Epoxy equivalent [3] | 177 | 145 | 232 |

[1] Amber liquid.
[2] Light yellow liquid.
[3] Number of grams of resin containing one gram mole of epoxide.

[2] Polymer solution contained 1720 parts by weight of toluene per 100 parts polymer.
[3] Polymer solution contained 1000 parts by weight of cyclohexane per 100 parts polymer.
[4] Polymer solution contained 860 parts by weight of toluene per 100 parts polymer.
[5] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of original sample.

[6] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle was again weighed to the nearest 0.02 gram. The difference in the two weighings gives the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

[7] ASTM D-297-55T.

[8] Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.

As seen from the foregoing table, the untreated 47-Mooney polymer used in Run 1, designated as Polymer A, had a cold flow of 5.4 mg./min. Treatment with the epoxidized liquid polybutadiene reduced the cold flow to zero. In the remaining runs, polymer B was utilized. Treatment in Runs 4, 6, 9, 10, 11, 12, and 13 was similar to that used in Run 2 and in all instances a reduction in cold flow was obtained. In Run 7, in which solution blending was used, substantial reduction in cold flow was accomplished. Still further reduction in cold flow was effected by heating this sample at the temperature of boiling water for two hours. That the reduction in cold flow was attributable to the treatment with the polyepoxy compound was demonstrated by heating a sample of untreated dry polymer in Run 8. It is noted that no effect on cold flow was observed. Run 12 demonstrates that a substantial reduction in cold flow can be obtained when using a very small amount of the treating agent.

EXAMPLE II

The treated polymer from Run 7 and the control (Run 3) of Example I were compounded in accordance with the following recipe:

| | Parts by weight |
|---|---|
| Polymer | 100 |
| High abrasion furnace black | 50 |
| Zinc oxide | 3 |
| Stearic acid | 1 |
| Flexamine[1] | 1 |
| Philrich 5[2] | 5 |
| Resin 731D[3] | 5 |
| Sulfur | 1.75 |
| NOBS Special[4] | 1.05 |

[1] Physical mixture containing 65 percent of a complex diarylamine-ketone reaction product and 35 percent of N,N'-diphenyl-p-phenylenediamine.
[2] Aromatic oil.
[3] Disporportionated pale rosin stable to heat and light.
[4] N-oxydiethylene-2-benzothiazyl sulfenamide.

The stocks were cured 30 minutes at 307° F. and physical properties determined. The results of the tests are shown below in Table II.

TABLE II

| | Treated polymer | Control |
|---|---|---|
| 300% molulus, p.s.i.[1] | 1,525 | 1,150 |
| Tensile, p.s.i.[1] | 2,360 | 2,400 |
| Elongation, percent[1] | 405 | 570 |
| Reilience, percent[2] | 78 | 76 |
| Heat build-up, ΔT, °F.[3] | 42.6 | 43.9 |

[1] ASTM D412–51T Scott Tensile Machine L–6.
[2] ASTM D945–55 (modified). Yerzley oscillograph. Test specimen is a right circular cylinder 0.7 inch in diameter and 1 inch high.
[3] ASTM D623–52T Method A, Goodrich Flexometer, 143 lbs./sq in. load, 0.175 inch stroke. Test specimen is a right circular cylinder 0.7 inch in diameter and 1 inch high.

The data show that properties of the vulcanizate were not degraded by treating the polymer with epoxidized liquid polybutadiene.

As will be evident to those skilled in the art, many variations and modifications of the invention can be practiced in view of the foregoing disclosure. Such variations and modifications are believed to come within the spirit and scope of the invention.

I claim:
1. A method for reducing the tendency of cis-polybutadiene containing at least 85 percent cis-1,4-addition to cold flow prior to compounding and curing said cis-polybutadiene which comprises blending a solution of said cis-polybutadiene in a hydrocarbon solvent with a solution of a polyepoxy compound, said polyepoxy compound being one selected from the group consisting of diepoxybutane, 1,2,5,6 - diepoxyhexane, triepoxyhexane, 1,2,5,6,9,10 - triepoxydecane, 2,3,6,7,11,12-triepoxydodecane, 2,3,5,6-diepoxy-9-epoxyethyldodecane, pentaepoxyeicosane, 2,3,5 - triepoxyethyl - 9 - epoxyhexadecane, bis-(epoxydicyclopentyl)ether of ethylene glycol, limonene dioxide, vinylcyclohexene dioxide, and epoxidized polybutadiene, in a hydrocarbon solvent, the amount of said polyepoxy compound being in the range of 0.25 to 10 parts by weight per 100 parts by weight of said cis-polybutadiene; recovering said cis-polybutadiene from the resulting blended solution, and heating said recovered cis-polybutadiene at a temperature in the range of 30–150° C. for a period of from 5 minutes to 2 hours.

2. The method according to claim 1 in which said resulting blend is maintained at a temperature in the range of 75 to 120° C. for a period of from 30 minutes to 5 hours.

3. The method according to claim 1 in which said epoxy compound is epoxidized liquid polybutadiene.

4. The method according to claim 1 in which said epoxy compound is diepoxybutane.

5. The method according to claim 1 in which said epoxy compound is 1,2,5,6-diepoxyhexane.

6. The method according to claim 1 in which said epoxy compound is triepoxyhexane.

References Cited by the Examiner

UNITED STATES PATENTS

| 2,842,513 | 7/1958 | FitzGerald et al. | 260—836 |
| 2,959,531 | 11/1960 | Wheelock | 260—94.7 |
| 3,004,018 | 10/1961 | Naylor | 260—94.3 |
| 3,022,322 | 2/1962 | Wheelock et al. | 260—94.2 |
| 3,060,989 | 10/1962 | Railsback et al. | 260—5 |
| 3,073,792 | 1/1963 | Greenspan | 260—94.7 X |
| 3,084,148 | 4/1963 | Youngman et al. | 260—94.3 |

FOREIGN PATENTS 144,858  1/1952  Australia.

SAMUEL H. BLECH, *Primary Examiner.*

WILLIAM H. SHORT, *Examiner.*